UNITED STATES PATENT OFFICE.

WILMA EPPERS, OF CHICAGO, ILLINOIS.

PHOTO-ENGRAVING METHOD.

1,234,888. Specification of Letters Patent. Patented July 31, 1917.

No Drawing. Application filed July 15, 1914. Serial No. 851,101.

*To all whom it may concern:*

Be it known that I, WILMA EPPERS, a citizen of the United States, residing at Chicago, in the county of Cook and State of Illinois, have invented new and useful Improvements in Photo-Engraving Methods, of which the following is a full, clear, concise, and exact description.

My invention relates to improvements in the method of preparing and producing half-tone screens for photo-engraving work.

It is well known that in producing photographic negatives for photo-engraving work a half-tone screen having a stipple grain surface will give the most satisfactory results, but heretofore it has been impracticable to produce commercially a stipple grain screen having the desired texture. By my improved method of making the screen I am enabled to produce a screen having a stipple grain surface of extremely fine texture, which has been found to give entirely satisfactory results.

In carrying out my method I first prepare an emulsion plate. The emulsion for this plate may be of any of the well known formulas, and one method of making the emulsion for the plate may consist of mixing gelatin, 6 ounces, potassium bichromate, 2 ounces, potassium ferrocyanid, 4 drams, ammonia water, 2 drams, chromic acid, 2 drams, these all being mixed in about 44 ounces of water. This emulsion is then thinly applied to a base, which may be of glass or any other desired material, and is exposed to the light, which exposure, after the emulsion plate has been suitably washed or placed in a water bath, causes the surface to take a fine stipple grain, which stipple grain after the plate has become dry and thereby sufficiently hardened, is inked. A rubber or composition cylinder is then rolled over the inked surface and receives the stipple impression thereon, which impression is transferred to a transparent plate and thereby forms the screen.

While I may transfer the impression directly from the emulsion plate to the transparent plate by means of the rubber roller, I have also found it advantageous in numbers of instances to transfer the impression from the emulsion plate by means of the roller or cylinder to a copper plate, then etching the copper plate, after which the copper plate may be inked and the impression taken by means of a soft roller, preferably a composition roller, from the copper plate, and transferred by means of this roller to the transparent plate to form the screen.

Where I have used the expression "photo-engraving" in the specification and claims, it will be understood that this term is used as a common name for the many processes by which a photograph may be made to afford a plate from which can be taken prints in ink corresponding to the original of the photographic image.

Having thus described my invention, what I claim as new and desire to secure by Letters Patent, is—

1. The method of forming a stipple grain screen which consists in forming on a printing plate a stipple grain, inking said plate and transferring by pressure said inked stipple-grain to a transparent plate to form a stipple grain surface on said plate.

2. The method of forming a stipple grain screen which consists in producing an emulsion plate comprising a mixture of gelatin, bichromate of potassium, ferrocyanid, ammonia water and chromic acid, exposing said plate to the light, then developing said plate to form a stipple grain texture on the surface thereof, inking said plate and printing from said plate to a transparent plate to transfer said stipple grain to the transparent plate.

3. The method of forming a stipple-grain screen which consists in producing a stipple-grain effect on the surface of a suitable plate, then transferring the stipple-grain effect thus produced on said plate by inking the same and passing a roller over said inked surface, and then transferring from said roller to a transparent plate.

In witness whereof, I have hereunto subscribed my name in the presence of two witnesses.

WILMA EPPERS.

Witnesses:
JOHN W. IPPERS,
E. R. KING.